(12) United States Patent
Bhattacharyya et al.

(10) Patent No.: US 12,045,821 B1
(45) Date of Patent: Jul. 23, 2024

(54) SYSTEM TO FACILITATE PAYMENT PROCESSING

(71) Applicant: AMAZON TECHNOLOGIES, INC., Seattle, WA (US)

(72) Inventors: Aneeta Bhattacharyya, Sammamish, WA (US); Venkatraman Srinivasan, Redmond, WA (US); Smita Joshi, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/657,289

(22) Filed: Mar. 30, 2022

(51) Int. Cl.
  *G06Q 20/40* (2012.01)
  *G06Q 20/06* (2012.01)
  *G06Q 30/0601* (2023.01)

(52) U.S. Cl.
  CPC ..... *G06Q 20/40145* (2013.01); *G06Q 20/065* (2013.01); *G06Q 20/40155* (2020.05); *G06Q 30/0601* (2013.01)

(58) Field of Classification Search
  CPC .......... G06Q 20/40145; G06Q 20/065; G06Q 20/40155; G06Q 30/0601
  See application file for complete search history.

(56) References Cited

U.S. PATENT DOCUMENTS

| | | | | |
|---|---|---|---|---|
| 2017/0357965 | A1* | 12/2017 | Knopp | G06Q 20/385 |
| 2018/0018660 | A1* | 1/2018 | Gomes | H04L 63/102 |
| 2018/0114226 | A1* | 4/2018 | Desai | G06Q 20/40145 |
| 2018/0341948 | A1* | 11/2018 | Kumnick | G06Q 20/4016 |
| 2021/0344674 | A1* | 11/2021 | Chen | H04L 9/088 |
| 2022/0358487 | A1* | 11/2022 | Garner | G06Q 20/3574 |
| 2023/0214829 | A1* | 7/2023 | Braundmeier | G06Q 20/407 705/39 |

OTHER PUBLICATIONS

EMV Payment Tokenisation Specification Technical Framework, Oct. 2021, EMVCo, LLC., Version 2.3 (Year: 2021).*
"Book C-3 Kernel 3 Specification", Proceedings of the EMV ContactlessSpecifications for Payment Systems, Version 2.6, Feb. 2016, 164 pages.
"Host Card Emulation (HCE) 101", Proceedings of the Smart Card Alliance Mobile & NFC Council White Paper, Publication No. MNFCC-14002, Aug. 2014, 32 pages.
Van Den Breekel, et al., "EMV in a Nutshell", Proceedings of KPMG, IBM Research Zurich, Raboud University Nijmegen, Jun. 29, 2016, 37 pages.

* cited by examiner

*Primary Examiner* — John W Hayes
*Assistant Examiner* — Yingying Zhou
(74) *Attorney, Agent, or Firm* — Lindauer Law, PLLC

(57) ABSTRACT

A point-of-sale (POS) system may use biometric or other contactless techniques to determine tokenization data that attributes a transaction with a particular payment account for settlement. A first payment method specified by a user for use at the POS may be issued by a first bank that does not participate in tokenization. A second payment account associated with a different entity and issued by a second bank that does support tokenization is associated with the first payment method. The POS transaction completes, using a token associated with the second payment account. Another transaction then takes place in which the second bank charges the first bank for the amount of the completed transaction.

20 Claims, 6 Drawing Sheets

SYSTEM TO FACILITATE PAYMENT PROCESSING

BACKGROUND

Facilities such as stores, offices, and so forth, may need the ability to accept payment from users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
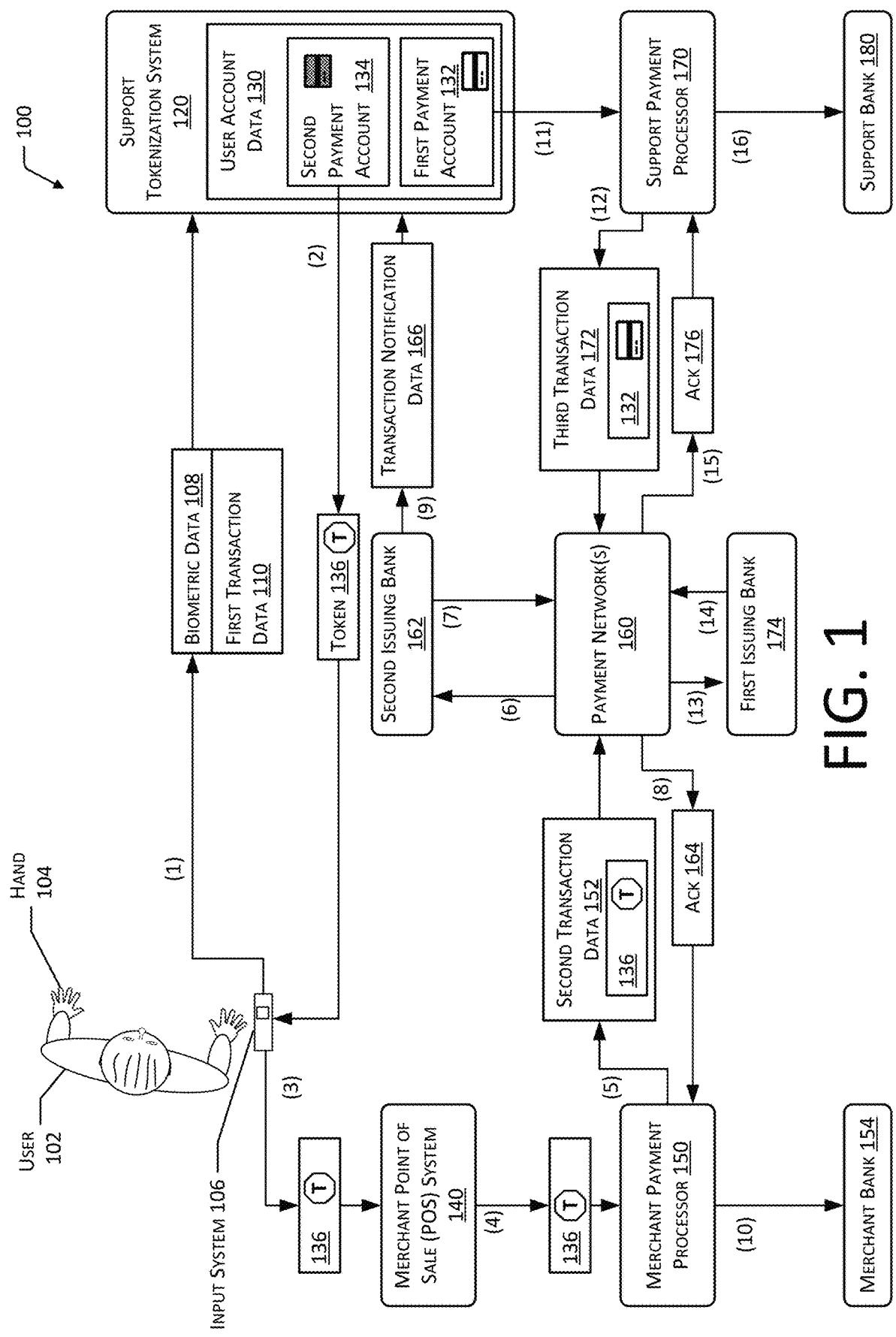
FIG. 1 illustrates a payment system that provides for a fallback payment account, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Electronic payment mechanisms, such as debit cards, credit cards, stored value cards, and so forth provide significant convenience in facilitating a transfer of value between parties. For example, a user may pay for goods and services using a credit card instead of having to carry cash.

Existing electronic payment mechanisms typically have the user carrying a physical device such as a card, smartphone, fob, and so forth. To perform a payment, the user presents that physical device to a payment terminal. For example, the user may swipe a credit card that includes a magnetic stripe, insert a card with electrical contacts into a reader, place a contactless card proximate to a wireless interface, and so forth.

By way of illustration, and not necessarily as a limitation, the contactless card may be an EMV device that is compliant with at least a portion of the ISO/IEC 14443 as promulgated by the International Organization for Standardization (ISO) and the International Electrotechnical Commission (IEC, EMVCo, and so forth). In other implementations other standards for wireless data transfer may be utilized. The contactless card may communicate with the payment terminal wirelessly. For example, the contactless card may use a near field communication (NFC) communication interface. The NFC communication interface may include a radio transmitter, radio receiver, and so forth.

To provide the various functions associated with electronic payment, ultimately information is exchanged that is representative of an account number. In some situations, cryptographic techniques are used to encrypt account numbers or other secret data. Another approach to securing secret data is to associate a payment token (or "token") with a particular account. The token acts as a surrogate for secret data that must remain secure, such as an account number. The token may improve security because, while a token may be associated with secret data, it cannot be used to derive that secret data. Tokens may have other characteristics, such as digital signatures, expiration times, and so forth. In the unlikely event a token is compromised the underlying secret data such as an account number remains secure. This improves overall robustness and reduces financial and operational losses due to a data breach.

While tokenization and the use of tokens offers many advantages, their use does require changes to the underlying payment infrastructure, particularly to the infrastructure of participating financial institutions such as merchant banks. For example, a merchant bank needs to deploy systems that support the use and processing of tokens. Such deployment requires time and expense. Some merchant banks may be faster at adopting such technology than other merchant banks. As a result, there is a disparity between merchant banks: some support tokens while others do not.

A user may establish a payment account, such as a credit card account, debit card account, and so forth, with a merchant bank of their choice. As mentioned above, some merchant banks may support tokens while others do not. Information as to whether tokens are even supported by a particular merchant bank may be inaccessible to a user, resulting in the user being unaware of whether this functionality is supported or not.

Electronic payment, including payment systems that use contactless technology, such as NFC smart cards, biometric input, and so forth, provide substantial benefits to a user. These benefits include reduced time to complete a transaction, convenience, and the potential to reduce physical contact between users. For example, biometric input such as a palm print acquired using a camera requires no physical contact with the biometric input device, avoiding the transfer of contaminants such as dirt, pathogens, and so forth from one user to another. However, to maintain a high level of security with respect to confidential data such as account numbers, such payment systems may implement tokens and call for the use of related infrastructure by the participating financial institutions.

The advantages of tokens are compelling in situations such as devices that implement host card emulation (HCE) or other technology. HCE comprises software executing on a physical device to emulate a card and provide the necessary commands and responses to a payment terminal. For example, the HCE allows a device such as a cellphone, smartwatch, or interface device near the merchant point of sale (POS) to operate as if it were an EMV compliant contactless payment device, such as a smart credit card, and participate in a payment interaction with a payment terminal.

Use of the HCE does introduce the potential for compromise of data. For example, payment tokens and other information may be present in cleartext in memory of a device. As a result, use of the HCE may increase the chance of secret data being compromised. However, as mentioned the use of tokens substantially mitigates those risks.

Described in this disclosure is a system and techniques that allow for a user to participate in a tokenized payment transaction in a situation where their intended payment account does not support tokenization. The payment transaction may be based on one or more of biometric data, physical card contact, contactless card presentation, and so forth. In implementations where biometric data is used and no participating device is presented by the user, an interface device using HCE may facilitate the transaction with legacy POS systems.

In implementations using biometric data, a biometric input device obtains biometric data from a user. For example, the user may present a hand to a palmprint scanner, a finger to a fingerprint scanner, have an image of their iris obtained, and so forth. The biometric input device provides the biometric data to a biometric identification system. The biometric identification system determines if there is user account data associated with the biometric data.

The user account data includes a first payment account, such as provided by the user. During enrollment to use the payment system, a user opts in and provides the first payment account, such as a credit or debit card, that they prefer to use to pay for subsequent transactions. If the first payment account does not support tokenization, a second payment account is associated with the user account. The first payment account is associated with a first entity, such as the user. In contrast, the second payment account is associated with a second entity, such as an operator of a support system. For example, the first payment account may be associated with user "Pat Jones" through "Merchant Bank Alpha" while the second payment account is associated with "Support Company, Inc." through "Merchant Bank Beta". In this example, "Merchant Bank Alpha" is unable to support tokenization, while "Merchant Bank Beta" is able to support tokenization.

After enrollment, information such as biometric data and first transaction data is sent from an input system to a support tokenization system. The first transaction data includes a first transaction value, such as the amount of a purchase in dollars. The biometric data is used to determine the corresponding user account and assigned second payment account. A token is then determined that is representative of the second payment account. The token is then provided to the input system. The input system may then pass the token to a merchant's point of sale (POS) system. The POS system may then use the token to complete the transaction at the POS. The POS system determines second transaction data that is then used to generate a transaction to settle funds from the second payment account to the merchant via the merchant's bank.

The support tokenization system also determines third transaction data to charge the first payment account. This third transaction data may specify a third transaction value that is the same as the first transaction value. This third transaction data may then be used to generate a transaction to settle funds from the first payment account to the support system's account via the support system's bank.

The payment system may perform other operations during use. The system may determine whether criteria to assign a second payment account have been met, whether to issue a token, and so forth. For example, at enrollment or at some time thereafter, an authorization or test transaction may be made by the support system to test that the first payment account is valid for use. If the first payment account is invalid, the system may suspend issuing tokens based on the second payment account.

The system described in this disclosure provides for a fallback payment account to be used. This allows a user to participate in using the system, even if their underlying financial institution fails to support more sophisticated security techniques, such as tokenization. As a result, user experience is improved by avoiding a situation in which the transaction would otherwise be rejected due to non-compliance by the underlying financial institution. By allowing participation, overall security of the user's secret data such as credit card information as well as the security of supporting systems is substantially improved.

As financial institutions such as banks upgrade their infrastructure, the payment system may then transition to providing tokens, or other enhanced security features, based on the first payment account data. This provides a seamless upgrade path from the perspective of the user and also eases deployment concerns for the financial institution. Meanwhile, merchants are able to continue to process transactions while benefiting from improved security and the reduced costs associated with that improved security.

FIG. 1 illustrates a payment system 100 that provides for a fallback payment account, according to some implementations.

In this illustration, connecting lines may include a number within parentheses that indicates an order of operations according to one implementation. For example, the operation of "(1)" occurs before "(2)". In other implementations, operations presented here may be performed in a different order or in some situations omitted. For ease of description, and not as a limitation, the term "bank" is used. It is understood that the techniques described may be used with regard to other financial institutions, such as credit unions, trust companies, mortgage loan companies, and so forth.

In the implementation shown, a user 102 presents their hand 104 to an input system 106 that acquires biometric data 108. The input system 106 may also determine other information, such as first transaction data 110. For example, the first transaction data 110 may comprise one or more attributes indicative of a type of transaction such as "purchase" or "return", currency, actual transaction value, placeholder transaction value, and so forth. The biometric data 108 and the first transaction data 110 are provided to a support tokenization system 120. In some implementations, the first transaction data 110 may comprise the biometric data 108, or information based on the biometric data 108. The support tokenization system 120 stores or has access to a data store that includes user account data 130. The user account data 130 may comprise information based on biometric data 108 obtained previously, such as during enrollment. The support tokenization system 120 and enrollment is discussed in more detail with respect to FIG. 2.

The user account data 130 may comprise a first payment account 132. The first payment account 132 may comprise a preferred credit card number, debit card number, and so forth that the user 102 provided during enrollment to pay for purchases using the payment system 100. The first payment account 132 is associated with a first entity, such as the user 102, the user's legal guardian, employer, and so forth.

The first payment account 132 is associated with, issued by, or otherwise maintained by a first financial institution. For example, the first payment account 132 may be a credit card that is issued by a first bank.

Different banks may support different payment modes, with those modes comprising different technologies, protocols, procedures, and so forth. Over time, some payment modes are deprecated while new payment modes are added. For example, the embossing of a carbon paper receipt using a physical credit card is no longer performed. Instead, modern payment systems utilize electronic payment modes to move, or "settle", funds between participants according to the transactions they engage in.

Because payment account information can be used to transfer funds, such information is secret and subject to careful controls to prevent loss. For example, account information may be encrypted to try and prevent discovery by an adversary. While very useful, cryptographic techniques do have several limitations. At some point, most cryptographic systems have to decrypt the information into "cleartext" for processing. For example, within a dedicated secure execution environment (SEE) that is subject to tight limitations on access and the instructions that can be performed, an encrypted credit card may be processed to determine "cleartext", the actual account number itself. A compromise of the SEE may leave the cleartext data vulnerable.

Another approach to securing secret data is "tokenization". Instead of sending the secret data, a token is assigned in its place. The payment system 100 described in this disclosure may use a payment token (or "token") that is associated with a particular account. The token acts as a surrogate for secret data that must remain secure, such as an account number. The token may improve security because, while a token may be associated with secret data, it cannot be used to derive that secret data. Tokens may have other characteristics, such as being digitally signed, having an expiration time, and so forth. In the unlikely event a token is compromised the underlying secret data such as an account number remains secure. This improves overall robustness and reduces financial and operational losses due to a data breach.

While tokenization and the use of tokens offers many advantages, some financial institutions do not yet support their use. Deployment of the needed infrastructure requires time and expense. As a result, there is a disparity between financial institutions: some support tokens while others do not.

Returning to FIG. 1, if the first payment account 132 is associated with a first financial institution that supports a first payment mode, such as tokenization or other protocol specified by the payment system 100, then a token may be issued that is associated with the first payment account 132. However, if the first financial institution does not support the first payment mode, without some other intervention the transaction desired by the user 102 would fail.

To prevent such failure, the support tokenization system 120 provides a fallback mechanism as described herein. The support tokenization system 120 may determine, such as with a test transaction or by retrieving previously stored data, that the first payment account 132 does not support a first payment mode, such as tokenization or other protocol specified by the payment system 100. Responsive to this, a second payment account 134 is assigned to the particular user account specified by the user account data 130. In some implementations, if available, the second payment account 134 assigned may be associated with a same payment network 160 as the first payment account 132.

The second payment account 134 is associated with a financial institution that does support the first payment mode, such as tokenization or other protocol specified by the payment system 100. The second payment account 134 is associated with a second entity, such as a company operating the support tokenization system 120. While the user 102 is aware of, and may be personally financially responsible for, the first payment account 132, they may have no knowledge of the second payment account 134. Likewise, because the second payment account 134 is associated with a different, second, entity the user 102 is not in direct privity with the second payment account 134.

The support tokenization system 120 determines the user account data 130 that is associated with the biometric data 108. Based on this, the support tokenization system 120 returns a token 136 that is based on the second payment account 134. The token 136 may then be sent to the input system 106. The input system 106 may then pass the token 136 and associated information, such as the first transaction value, to a merchant point of sale (POS) system 140. The merchant POS system 140 may then pass the token 136 and associated information to a merchant payment processor 150. The merchant payment processor 150 may provide services such as secure transport, data formatting, and so forth.

The merchant payment processor 150 may then send second transaction data 152 that comprises or is based on the token 136 to a payment network 160. The payment network 160 processes the second transaction data 152 and may determine a response. The payment network 160 may send the second transaction data 152 to the bank or institution associated with that transaction data. For example, the second transaction data 152 may be sent to a second issuing bank 162 that is the issuing bank for the second payment account 134. The second issuing bank 162 may provide a response. The response, such as an acknowledgement or "ack" 164, is sent from the second issuing bank 162 via the payment network 160 to the merchant payment processor 150.

Responsive to the successful processing of the second transaction data 152 by the payment network 160 or the second issuing bank 162, funds are transferred from the second payment account 134 to a merchant account at a merchant bank 154 or other financial institution. In the situation where the user 102 has purchased something, the merchant now has possession of the funds for that purchase. At this point in the illustration, the second payment account 134 has been billed but the first payment account 132 has not.

In some implementations, one or more of the payment network 160, the second issuing bank 162, the merchant payment processor 150, or other participant in the process may provide transaction notification data 166 to the support tokenization system 120 or a support payment processor 170. For example, responsive to the second transaction data 152, the second issuing bank 162 may send transaction notification data 166 to the support tokenization system 120. The transaction notification data 166 may be indicative of the success or failure of the processing of the second transaction data 152. Responsive to this, the support tokenization system 120 sends data to a support payment processor 170. The support payment processor 170 provides payment processing services to the support tokenization system 120. For example, secure transport, data formatting, and so forth.

From the perspective of the user 102, the transaction at the point of sale may be considered complete. For example, the token 136 was accepted and the transaction completed. The user 102 may then receive a receipt, either printed or electronic. This receipt may include information as to the payment account utilized for the transaction. For example, for reference the receipt may indicate the last four digits of the token 136 or the last four digits of the second payment account 134. In some implementations, additional information may be included on the receipt to indicate to the user 102 the second payment account 134 was used on their behalf.

The support payment processor 170 may then send third transaction data 172 that comprises or is based on the first payment account 132 to the payment network 160. The payment network 160 may then send the third transaction data 172 to a first issuing bank 174 that issued the first payment account 132. As mentioned earlier, the first payment account 132 does not support tokenization. The first issuing bank 174 processes the third transaction data 172 and may determine a response, such as an acknowledgement or "ack" 176. The ack 176 is sent from the first issuing bank 174 via the payment network 160 to the support payment processor 170.

Responsive to the successful processing of the third transaction data 172 by the payment network 160, funds are transferred from the first payment account 132 to a merchant account at a support bank 180 or other financial institution. In the situation where the user 102 has purchased something, the merchant bank 154 now has possession of the funds for that purchase while the support bank 180 has been reconciled those funds.

Other implementations may vary the process described above. For example, the first transaction data 110 may be omitted. Responsive to the support tokenization system 120 receiving biometric data 108 that is associated with a valid first payment account 132, a token 136 may be returned. In other examples other configurations of payment processors, payment networks, banks, and other participating parties may be modified. For example, in some implementations, the payment processor may be omitted and a merchant POS system 140 communicates directly with a payment network 160.

Before sending the token 136 to the input system 106, the support tokenization system 120 may perform one or more checks. For example, before issuing the token 136, the support tokenization system 120 may send an authorization request to the payment network 160 via the support payment processor 170. Upon receipt of an approved authorization, the token 136 may be released to the input system 106. This is discussed more with regard to FIG. 2.

The illustration of FIG. 1 may be used for other types of transactions, such as a "lookup of account" to facilitate a warranty claim or other operation by the merchant. For example, the user 102 may use the input system 106 to provide biometric data 108, and the support tokenization system 120 may return the token 136. Based on the token 136, the merchant POS system 140 may retrieve a previous transaction that used that token 136.

The system 100 may also support various promotional or incentive programs associated with a particular payment account. For example, the first issuing bank 174 may offer an incentive program for use of the first payment account 132 such as providing credits for purchases from particular types of merchants, points that may be redeemed for travel services, and so forth. To support this functionality, during operation the third transaction data 172 may comprise a merchant category code (MCC) that is based on an MCC of the merchant that provided the first transaction data 110 and processed the second transaction data 152. For example, if the user 102 is making a purchase at a restaurant with an MCC of "restaurant", the third transaction data 172 may include an MCC value of "restaurant". In this way, the benefits to the user 102 associated with the incentives provided by the first issuing bank 174 may be realized.

In another implementation, promotional or incentive programs may be supported by data transfer with the first issuing bank 174. For example, the support tokenization system 120 may provide information such as merchant identifier, transaction type, transaction value, and so forth to the first issuing bank 174. The first issuing bank 174 may then use this information to reconcile their records of promotional credits, points, and so forth.

In addition to the purchase of goods or services, the system 100 may also be used to facilitate a return or other situations in which a credit is made to the user's 102 first payment account 132. For example, a credit transaction resulting from a return of a good or service may be entered on the merchant POS system 140. The process as described may proceed, with funds being transferred from the merchant account to the second payment account 134 and funds being transferred from the second payment account 134 to the first payment account 132.

Figure 2:
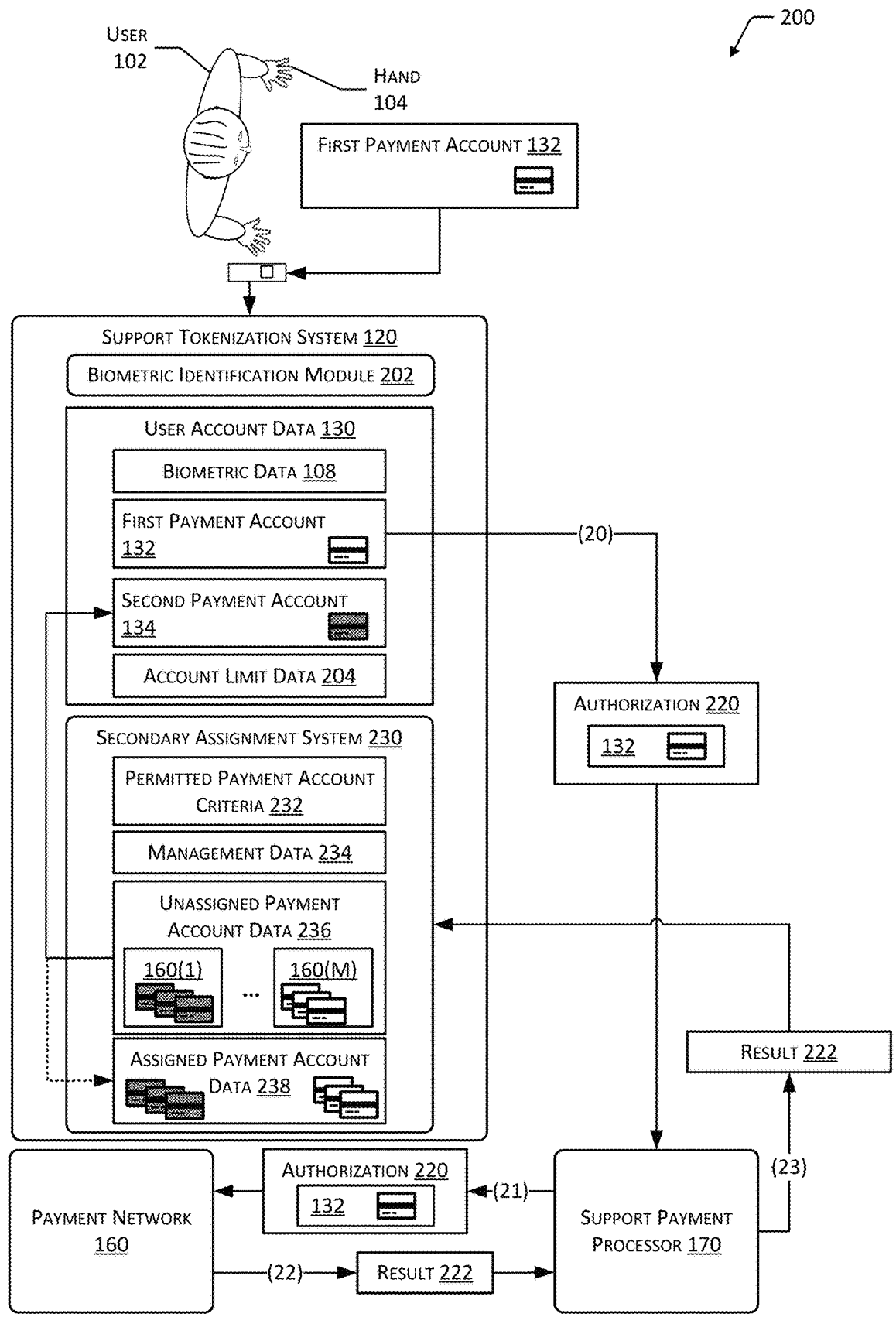
FIG. 2 illustrates enrollment with a first payment account by a user and assignment of a second payment account, according to some implementations.

FIG. 2 illustrates at 200 enrollment of a first payment account 132 by a user 102 and assignment of a second payment account 134, according to some implementations.

The support tokenization system 120 may include, or be in communication with, a biometric identification module 202. The biometric identification module 202 may process the biometric data 108 to determine user account data 130 that is associated with the user 102. In one implementation, the biometric identification module 202 may comprise one or more trained machine learning systems, such as deep convolutional neural networks.

During an enrollment process, the user 102 opts in and provides biometric data 108. The biometric identification module 202 is used to determine if the user 102 has previously enrolled. If not, a user account is created or assigned to the user 102.

During an enrollment process, the user 102 provides the first payment account 132. As described, in some circumstances the financial institution that issued the first payment account 132 may be unable to support the first payment mode that is used by the payment system 100. The support tokenization system 120 may determine if the first payment account 132 supports the first payment mode. For example, the support tokenization system 120 may attempt to determine a token 136 based on the first payment account 132. If this succeeds, the system 100 may proceed to use the first payment account 132. If this fails, the system 100 may proceed to assign the second payment account 134. In other implementations, other techniques may be used to determine if the first payment account 132 is able to support the first payment mode used by the payment system 100. For example, an information request may be sent to the payment network 160 using the first payment account 132, data may be retrieved from storage, and so forth.

The support tokenization system 120 may determine whether the first payment account 132 is valid. For example, the support tokenization system 120 may send an authorization 220 to the payment network 160 via the support payment processor 170. A result 222 from the payment network 160 is passed via the support payment processor 170 to the support tokenization system 120.

If the support tokenization system 120 determines that the first payment account 132 is valid, but unable to support the first payment mode used by the payment system 100, a secondary assignment system 230 may be used to assign the second payment account 134.

The secondary assignment system 230 may use permitted payment account criteria 232 to determine whether to assign a second payment account 134. The permitted payment account criteria 232 may specify one or more card types, such as credit, debit, pre-paid, electronic benefit transfer, and so forth. For example, the permitted payment account criteria 232 may allow assignment of a second payment account 134 if the first payment account 132 is a credit card, debit, electronic benefit transfer, but would disallow if a pre-paid card is presented as the first payment account 132.

The secondary assignment system 230 may maintain management data 234. The management data 234 is indicative of the payment accounts and the user account to which they have been assigned. The secondary assignment system 230 may maintain unassigned payment account data 236. The unassigned payment account data 236 may comprise a set of payment accounts that are available for use by the support tokenization system 120. In one implementation this pool of accounts may be valid and available for immediate use. For example, the support bank 180 may issue in advance a block of 100,000 account numbers. This may reduce latency during operation, such as facilitating enrollment and subsequent immediate purchase by the user 102 without waiting for an account to be issued. In another implementation, the secondary assignment system 230 may request a payment account from the support bank 180 on demand.

In some implementations, the unassigned payment account data 236 may include pools of accounts that are associated with different payment networks 160(1)-(M). For example, the unassigned account data 236 may comprise a first block of 50,000 account numbers that are associated with a first payment network 160(1) and a second block of 70,000 account numbers that are associated with second payment network 160(2). The secondary assignment system 230 may attempt to provide, where available, a second payment account 134 that is affiliated with a same payment network 160 or the first issuing bank 174 as the first payment account 132. For example, if the first payment account 132 provided by the user 102 is affiliated with the second payment network 160(2), the secondary assignment system 230 may select an account number from a pool of unassigned account numbers in the unassigned payment account data 236 that are from the second payment network 160(2). By providing the user 102 with the same payment network 160 as the first payment account 132, the user 102 may have a more consistent and familiar experience.

As payment accounts are assigned by the secondary assignment system 230, they are reallocated from the unassigned payment account data 236 to the assigned payment account data 238. For example, the assigned payment account data 238 may comprise a data store that indicates the user accounts and associated second payment account 134 for each of those user accounts. In some implementations, once assigned, particular payment account data may not be re-used. For example, if the user 102 cancels their account with the support tokenization system 120, the second payment account 134 assigned may be deactivated.

In some implementations, a single user 102 and their associated biometric data 108 may be associated with more than one first payment account 132. For example, the user 102 may have a first payment account 132(1) that is associated with personal use, a first payment account 132(2) that is associated with business use, and so forth. Each of the first payment accounts 132 may be associated with respective second payment accounts 134. In some implementations, the selection of a particular one of the first payment accounts 132 associated with the user 102 may be made at the time of the transaction, may be pre-defined, and so forth. For example, the user 102 may select a particular first payment account 132 using a user interface of the input system 106. In another example, the user 102 may have specified that transactions for a particular merchant are to use the specified first payment account 132.

In some implementations, a one-to-one relationship may be maintained for user accounts that have been assigned second payment accounts 134. For example, each user account may have a single second payment account 134 assigned. User accounts that have first payment accounts 132 that support the first payment mode may have no second payment account 134 assigned.

In some implementations, a one-to-many relationship may be maintained for user accounts and second payment accounts 134. For example, a single user account may have two second payment accounts 134(1) and 134(2) assigned. This functionality may facilitate particular use cases, such as use in a different country, to facilitate transaction tracking, to improve security, and so forth.

The second payment accounts 134 may be persistent over time, or may be ephemeral. For example, a second payment account 134 may be issued for a single use, use for a particular interval of time, and so forth. The support tokenization system 120 maintains the relationship between the user account data 130 and the second payment account 134. As a result, any underlying changes such as expiration of the second payment account 134(1) and replacement of the second payment account 134(2) do not affect user experience. The user 102 continues to perform transactions and charges associated with those transactions appear on their first payment account 132, as expected.

After enrollment, the support tokenization system 120 may determine if the first payment account 132 remains valid. Validity checks may be performed with each transaction, for some transactions with specified criteria, at some interval, on demand, and so forth. For example, after receiving the first transaction data 110, the support tokenization system 120 may send an authorization 220 to the payment network 160 via the support payment processor 170. A result 222 from the payment network 160 is passed via the support payment processor 170 to the support tokenization system 120. If the result 222 indicates approval for the authorization, the support tokenization system 120 may send the token 136 to the input system 106. If the authorization is denied, the support tokenization system 120 may withhold, delete, or otherwise not provide the token 136 to the input system 106.

The support tokenization system 120 may check to determine if the first payment account 132 now supports the first payment mode, such as tokenization or the other protocols specified by the payment system 100. If the first payment account 132 is so determined, the support tokenization system 120 may proceed to issue tokens 136 based on the now-compliant first payment account 132.

The user account data 130 comprises biometric data 108 associated with a particular user 102 and associated information such as the first payment account 132, second payment account 134, account limit data 204, and so forth. The account limit data 204 may comprise information about one or more of the payment accounts associated with that user account. For example, the account limit data 204 may include a maximum permitted transaction amount, maximum daily transaction amount, a set of approved merchants, a set of approved items, a set of disapproved merchants, a set of disapproved items, and so forth. Different limits may be specified for different payment accounts of the user. For example, the first payment account 132 may have a maximum daily transaction amount of $500 while the second payment account 134 may have a maximum daily transaction amount of $300. The account limit data 204 may also include information indicative of failures of previously stored first payment accounts 132. For example, if a first payment account 132 is later deemed invalid with a balance outstanding to be reconciled, such as due to a failure of the third transaction data 172 to be processed, the support tokenization system 120 may disable the second payment account 134 functionality, prevent issuance of further tokens 136, or other action.

The support tokenization system 120 may compare one or more attributes of the first transaction data 110 with the account limit data 204 to determine whether to proceed with issuing a token 136. In some implementations, if the one or more attributes of the first transaction data 110 are less than or equal to the account limit data 204, the token 136 may be issued. For example, the support tokenization system 120 may not issue a token 136 if the first transaction data 110 indicates a transaction value that exceeds a threshold value specified in the account limit data 204.

The various elements of the system 100 may interact to provide successive checks and approvals prior to proceeding. As described above, at and after enrollment in some implementations, the first payment account 132 is tested for validity. The support tokenization system 120 may test the first transaction data 110, if available, to determine compliance with the account limit data 204. As a result, there is a high assurance that transactions proceeding through the system 100 are valid, minimizing potential for loss due to fraudulent activity.

Figure 3:
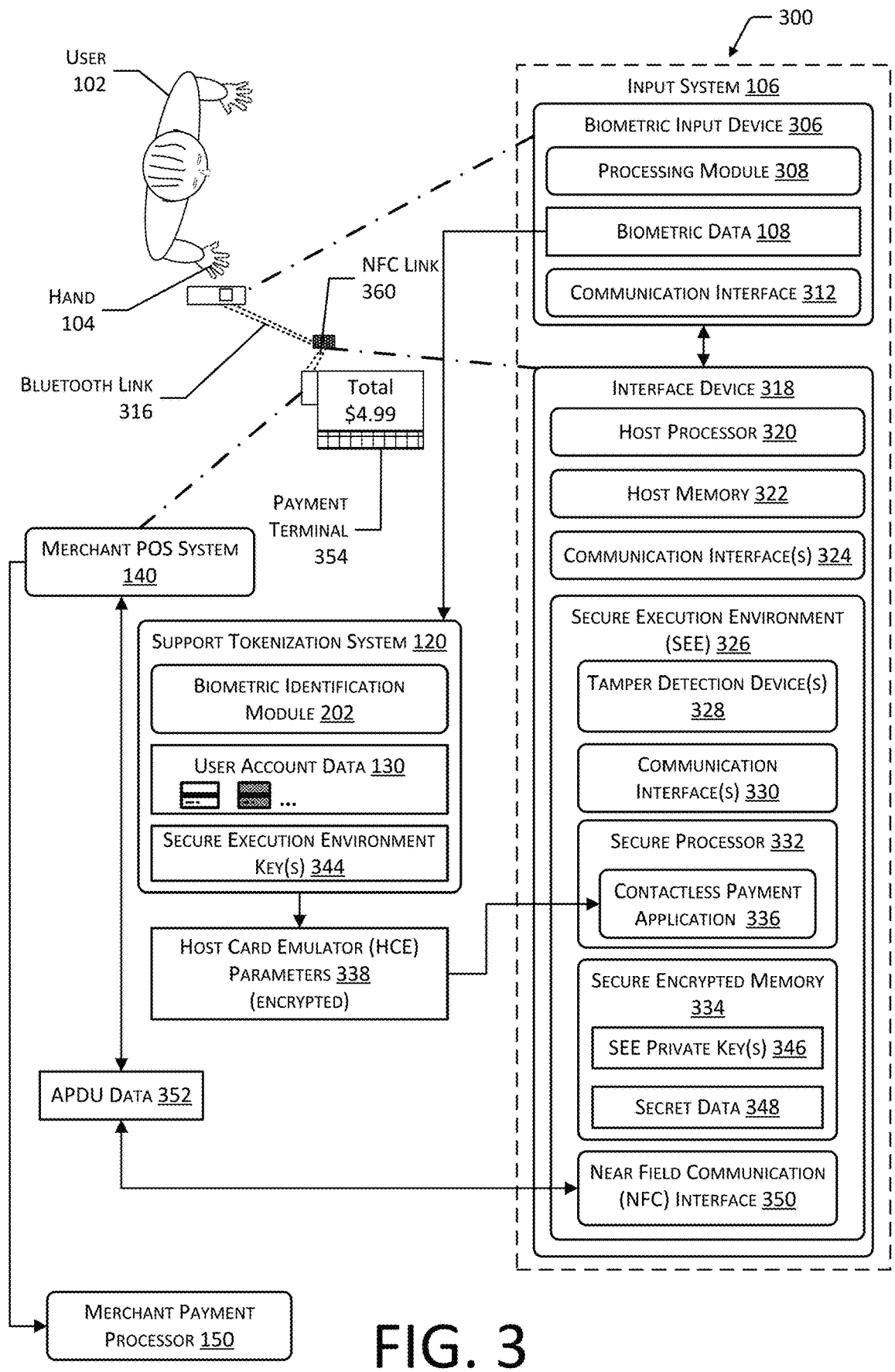
FIG. 3 illustrates an input system comprising a biometric input device and interaction with other system elements, according to some implementations.

FIG. 3 illustrates at 300 part of the system 100 including the input system 106, according to some implementations. In the implementation shown, the input system 106 may comprise a biometric input device 306 and an interface device 318. In other implementations other configurations may be used. For example, the biometric input device 306 and the interface device 318 may comprise a single device.

The user 102 provides biometric input, such as presenting their hand 104 to a biometric input device 306. The biometric input device 306 may include one or more sensors such as a palm print reader, fingerprint scanner, iris scanner, camera, and so forth. The biometric input device 306 includes a processing module 308 that uses input from the sensors to produce biometric data 108. The biometric data 108 is indicative of one or more features of the user 102, or a portion thereof. For example, the biometric data 108 may comprise image data, feature vectors, and so forth of a palm of the hand 104 of the user 102. The biometric input device 306 may use a communication interface 312 to send the biometric data 108 to a biometric identification module 202. For example, the biometric identification module 202 may comprise one or more servers at another location. The communication interface 312 may connect to a local area network which in turn connects to a wide area network, such as the Internet.

The biometric input device 306 may include or be in communication with an interface device 318. The interface device 318 may include a host processor 320. For example, the host processor 320 may execute an operating system, user applications, and so forth. A host memory 322 comprises one or more computer-readable storage media (CRSM) that may store data, instructions, and so forth.

A communication interface 324 provides communication between the interface device 318 and the biometric input device 306. For example, the communication interface 324 may provide a wired connection such as a universal serial bus (USB) connection, a wireless connection such as a Bluetooth link 316 using a Bluetooth interface, and so forth.

The interface device 318 includes a secure execution environment 326 (SEE). The secure execution environment 326 may include one or more tamper detection devices 328 or antitamper features, a communication interface 330, a secure processor 332, a secure encrypted memory 334, a near field communication (NFC) interface 350, and so forth. The NFC interface 350 may be used to establish an NFC link 360 with a payment terminal 354, as described below.

The tamper detection devices 328 may be configured to provide data indicative of physical or electronic tampering associated with an attempt to circumvent security features of the SEE 326. For example, the tamper detection devices 328 may comprise electrical conductors that, when broken, signal an attempt to gain physical access to an interior of the SEE 326. In another example, the tamper detection devices 328 may comprise a radiation sensor configured to detect x-ray radiation that may be used to non-invasively determine the structure of the SEE 326 hardware. In some implementations, the SEE 326 may be configured to erase data, be rendered inoperable, and so forth in the event of an actual or suspected attempt to improperly access the SEE 326 or a portion thereof.

The SEE 326 may include antitamper features. The antitamper features may be designed to render the SEE 326 inoperable in the event of actual or suspected compromise. For example, the antitamper features may be configured to destroy the contents of memory if the case of the SEE 326 being opened. In one implementation, the SEE 326 may comprise a Kinetis K81 MCU from NXP Semiconductors N.V. of Eindhoven, Netherlands. In other implementations other devices may be used.

The communication interface 330 may be used to provide communication between the SEE 326 and other devices in the interface device 318, such as the host processor 320. For example, the communication interface 330 may comprise an I2C interface that is in communication with the communication interface 312. Communication between the SEE 326 and other devices, such as the communication interface(s) 324, may be restricted. Such restrictions may be used to increase the resistance of the SEE 326 to attack. In one implementation, the SEE 326 may be limited to responding to a predetermined set of instructions and processing data that is compliant with one or more predetermined rules. For example, the SEE 326 may implement a "mailbox" type message handling system in which messages received by the communication interface 330 are assessed with respect to the predetermined set of instructions and the one or more predetermined rules. Continuing the example, if an instruction is received that is not present in the predetermined set of instructions, that instruction may be erased or disregarded. Likewise, if data is received that fails a predetermined rule such as being incorrectly formatted or being longer than a specified value, that data may be erased or disregarded.

The secure processor 332 executes a contactless payment application 336. In one implementation, the contactless payment application 336 may be instantiated in advance of a transaction and is available for use. This implementation reduces overall latency as the contactless payment application 336 is instantiated and available for use. In this implementation, the contactless payment application 336 is personalized or configured using HCE parameters 338 provided to the SEE 326. The support tokenization system 120 may provide the HCE parameters 338 to the SEE 326. When the transaction is complete, the contactless payment application 336 may depersonalize the contactless payment application 336. For example, the HCE parameters 338, register values, counters, and so forth of the contactless payment application 336 may be erased or reset to a default value.

The HCE parameters 338 may comprise one or more data elements that are associated with a transaction. In some implementations, the data elements may be compliant with at least a portion of the EMV contactless specifications for payment systems as promulgated by EMVCo, LLC in the "EMV Contactless Specifications for Payment Systems Book C-3 Kernel 3 Specification version 2.6". For example, the HCE parameters 338 may include one or more of a payment token, an application primary account number, cardholder name, application expiration date, issuer country code, application primary account number sequence number, and so forth.

In another implementation, the contactless payment application 336 may be instantiated for a particular transaction. Once instantiated, the contactless payment application 336 is personalized or configured using HCE parameters 338 provided to the SEE 326. When the transaction is complete, the contactless payment application 336 may be erased, as well as the HCE parameters 338 and other data associated with that instantiation.

The support tokenization system 120 may comprise the biometric identification module 202. The biometric identification module 202 may process the biometric data 108 to determine user account data 130 that is associated with the user 102. The user account data 130 may comprise data that is used to identify, authenticate, or otherwise provide a transfer of value. For example, the user account data 130 may comprise information such as the first payment account 132, the second payment account 132, expiration dates, verification codes, and so forth. As described above, if the first payment account 132 supports contactless processing, such as tokenization, the first payment account 132 may be used and a corresponding token 136 provided to the merchant POS system 140. However, in the event the first payment account 132 does not support tokenization, the system 100 may operate as described with regard to FIG. 1, providing a token 136 that is based on the second payment account 134, allowing the transaction to complete at the POS.

The support tokenization system 120 may retrieve from storage, or generate, the one or more host card emulator (HCE) parameters 338. The HCE parameters 338 may then be sent to the contactless payment application 336. For example, the user account data 130 may be used to determine the token 136 that is included, or used to determine the HCE parameters 338.

To maintain secrecy, the HCE parameters 338 are encrypted before transmission to the secure execution environment 326. In one implementation the support tokenization system 120 determines an SEE key 344 that is associated with the secure execution environment 326. The SEE key 344 may comprise a cryptographic key that is used specifically for encrypting communications with that particular secure execution environment 326. For example, the biometric data 108 may include information indicative of the particular biometric input device 306. The biometric input device 306 may digitally sign the biometric data 108, providing information as to the identity of the sending device and authenticity of the data. The support tokenization system 120 may then retrieve, based on the information indicative of the particular biometric input device 306 and the associated interface device 318, the SEE key(s) 344 which is then used to encrypt the HCE parameters 338.

During operation, the secure execution environment 326 may store SEE private key(s) 346, secret data 348, or other information within the secure encrypted memory 334. The secret data 348 may comprise one or more of the decrypted HCE parameters 338, or data derived therefrom. The SEE private key(s) 346 may comprise cryptographic private keys, symmetric keys, signature values used to validate the signature of the contactless payment application 336, and so forth. In one implementation, the SEE private keys 346 may comprise a value that is in and unique to the SEE 326, such as a particular bit pattern in a memory array upon startup that results due to manufacturing variations. In another implementation, the SEE private keys 346 may be stored in the secure encrypted memory 334 during manufacture. The SEE private key(s) 346 may comprise a private key value that is paired with a public key value that is known to the biometric processing system 314. In other implementations, the SEE private key(s) 346 may comprise a symmetric key that is shared with the biometric processing system 314. For example, the SEE key 344 and the SEE private key 346 may comprise the same value.

The encrypted HCE parameters 338 are received at the interface device 318 and may be passed to the SEE 326 via the communication interface 330 of the SEE 326. The encrypted HCE parameters 338 may then be decrypted by the secure processor 332 in the SEE 326, using the SEE private key(s) 346. The now decrypted HCE parameters 338 may be used to personalize the contactless payment application 336.

During operation, the contactless payment application 336 that is based on the HCE parameters 338, uses the NFC interface 350 to establish and NFC link 360 and exchange application protocol data unit (APDU) data 352 or other data with a payment terminal 354. For example, the APDU data 352 may comprise the data associated with a contactless transaction. For example, the APDU data 352 may include, or be based on, the token 136. The APDU data 352 may be compliant with at least a portion of the ISO/IEC 7816 standard.

In some implementations, the payment terminal 354 may comprise a card reader, keypad, or other devices. In some implementations the payment terminal 354 may perform one or more point-of-sale (POS) functions. For example, the payment terminal 354 may accept input from an operator that specifies an item or service purchased, generate receipts, and so forth. During operation of the system, the payment terminal 354 interacts with the interface device 318 as if the interface device 318 was a host card emulator or NFC-capable card and may proceed to generate transaction data. The transaction data may be sent to the merchant payment processor 150 or other participant. The second transaction data 152 may comprise the transaction data provided by the payment terminal 354.

Once the contactless payment application 336 completes the interaction with the payment terminal 354, the secret data 348, the HCE parameters 338, the instantiated contactless payment application 336, and other information in the secure execution environment 326 associated with the particular instantiation may be depersonalized, removing from the secure execution environment 326 the HCE parameters 338 and other data associated with the transaction. The instantiation of the contactless payment application 336 may remain. In another implementation, the instantiation of the contactless payment application 336 may be erased or otherwise destroyed. The interaction may be deemed complete when an acknowledgement is received, upon a determination of an error condition, after a timeout period, and so forth. In one implementation, state information is not maintained from one instantiation to the next, while the depersonalized contactless payment application 336 is retained in the SEE 326. In the implementation where the instantiation of the contactless payment application 336 has been removed, a previously stored installation file(s) for the contactless payment application 336 may then be used to instantiate the next contactless payment application 336 as needed.

Figure 4:
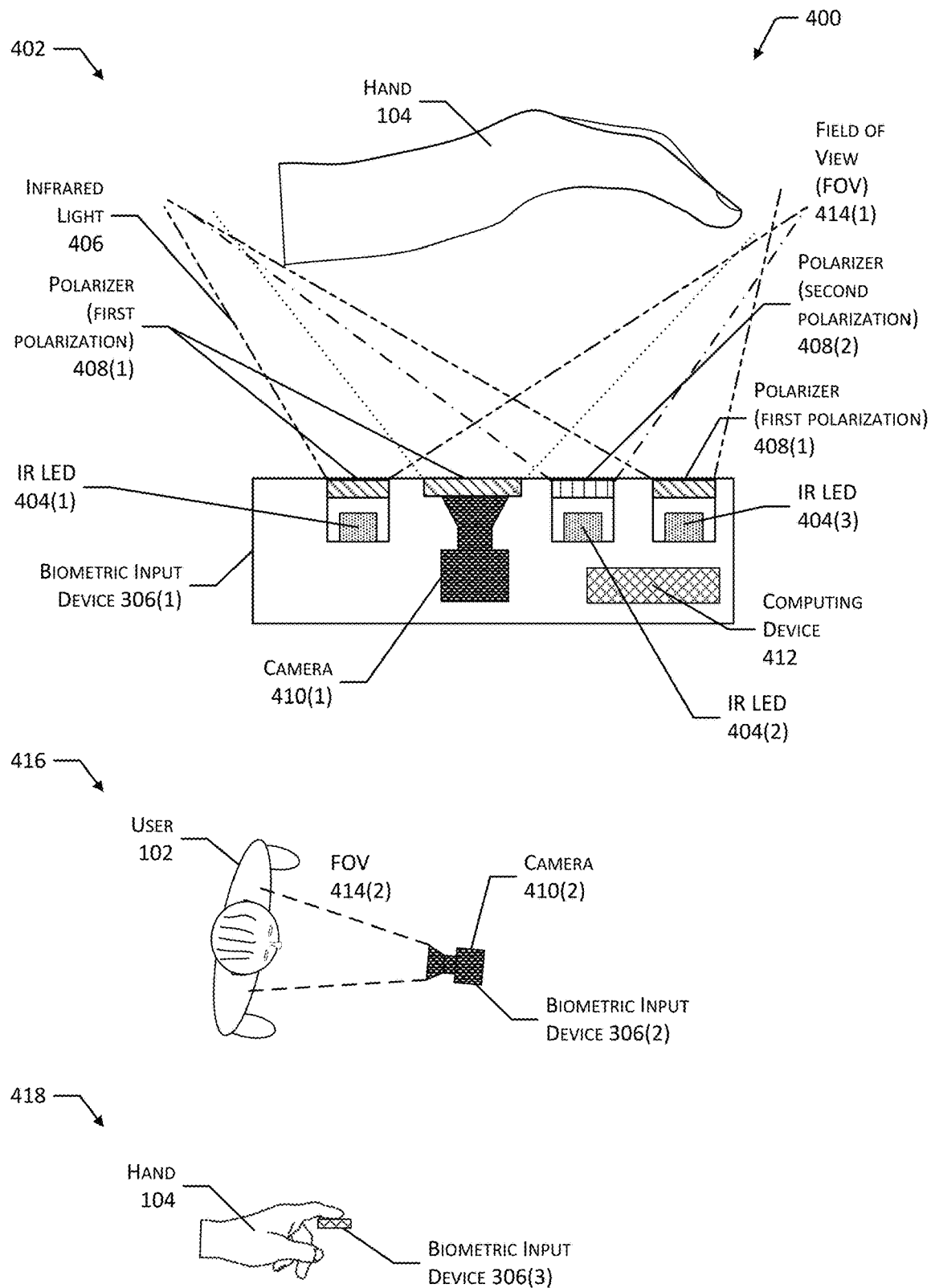
FIG. 4 illustrates biometric input devices that the payment system may use, according to some implementations.

FIG. 4 illustrates at 400 several biometric input devices 306 that the payment system 100 may use, according to some implementations.

At 402 a biometric input device 306(1) is depicted that obtains images of a user's hand 104, or portion thereof such as a palm. In this illustration, the hand 104 of the user 102 is positioned above the biometric input device 306(1). The biometric input device 306(1) may include one or more infrared (IR) light sources. For example, a first set of IR light emitting diodes (LEDs) 404(1), a second set of IR LEDs 404(2), and a third set of IR LEDs 404(3) are shown. In other implementations other devices may be used to generate infrared light. In some implementations, the wavelength of the IR light 406 may be between 750 and 1000 nanometers (nm).

The IR LED 404(1) is arranged adjacent to a first polarizer 408(1), such that IR light 406 produced by the IR LED 404(1) passes through the first polarizer 408(1). The IR light 406(1) that passes through the first polarizer 408(1) substantially exhibits a first polarization. Likewise, the IR LED 404(3) is arranged adjacent to a first polarizer 408(1). The biometric input device 306(1) includes a camera 410 that may also have a first polarizer 408(1), such that infrared light 406 captured by the camera 410 substantially exhibits the first polarization. In one implementation, the camera 410 with the first polarizer 408(1) may produce a raw first modality image when the hand 104 is illuminated by the light from the IR LED 404(1) with the first polarizer 408(1) that exhibits the first polarization.

In some implementations, a plurality of IR LEDs 404 with their respective polarizers 408 may be arranged at different locations in the biometric input device 306(1) relative to the camera 410. For example, four IR LEDs 404 with the first polarizers 408(1) may be arranged with one IR LED 404 at each corner of a square that is centered on the camera 410. In another implementation, the IR LEDs 404 and the polarizers 408 may form a ring around the camera 410. During operation, a computing device 412 or controller of the biometric input device 306(1) may operate the IR LEDs 404 individually or in groups to produce illumination that is either uniform or from a particular direction at different times. For example, during acquisition of raw first modality images, the IR LEDs 404 may be controlled to all be on during acquisition of one image at a first time. At a second time, selected IR LEDs 404, such as those in a particular corner of the square, may be controlled to be on during another image. By selectively illuminating the hand 104, external characteristics of the hand 104 such as ridges or creases may be enhanced due to shadow or other effects. For example, a controller of the biometric input device 306(1) may be configured to acquire one image using all IR LEDs 404 with the first polarization, then four images each using one of four IR LEDs 404 each at a different location with respect to the camera 410(1), followed by an image with the IR LED 404 that produces IR light 406 with a second polarization.

The biometric input device 306(1) includes a second IR LED 404(2) that is arranged adjacent to a second polarizer 408(2), such that the IR light 406 produced by the IR LED 404(2) passes through the second polarizer 408(2) substantially exhibits a second polarization. In one implementation, the camera 410(1) may produce a raw second modality image when the hand 104 is illuminated by the light from the IR LED 404(2) that exhibits the second polarization. A field of view (FOV) 414 indicates a region which is illuminated by the IR LEDs 404 and from which images from the cameras 410(1) may be obtained. In implementations involving multiple cameras 410(1), the FOV 414 is inclusive of the individual FOV 414 of each of the cameras 410(1). For example, the FOV 414 of each of the cameras 410(1) may overlap.

During operation, a computing device 412 or controller of the biometric input device 306(1) may operate the IR LEDs 404 that produce IR light 406 with the different polarizations and the camera 410(1) to acquire images of the hand 104 as illuminated by the different polarizations of light. For example, at a first time the IR LED 404(1) may be active and the camera 410(1) acquires the raw image data. Continuing the example, at a second time the IR LED 404(1) may be inactive, the IR LED 404(2) may be active, and the camera 410(1) acquires raw image data. The raw image data may comprise a stream of raw first modality image, raw second modality image, raw first modality image, raw second modality image, and so forth.

The camera 410 comprises detectors that are responsive to at least the IR light 406 being used. The camera 410 may be able to generate images at various frame rates. For example, the camera 410 may be able to generate an image every 1/20 of a second or faster, having a frame rate of 40 frames per second (FPS). An integration time (or exposure time) of the cameras 410 specifies the amount of time that photons are measured by the detectors to generate a single image. As the integration time decreases, the system may be less prone to blurring due to motion of the hand 104.

In some implementations, a polarized light source may be used, and the polarizer 408 adjacent to the light source omitted. For example, a quantum dot may emit IR light 406 with a particular polarization. Likewise, in some implementations, the camera 410(1) may include a detector that is sensitive to, or provides information indicative of, polarization of captured light and the polarizer 408 omitted.

The polarizer 408 may comprise a filter that is substantially transmissive to light of a particular polarization, while substantially absorbing or reflecting light with another polarization. The polarization may be one or more of linear or circular. For example, the first polarization 408(1) may be linear while the second polarization 408(2) may be circular. In another example, the first polarization 408(1) may be linear with a first angle and the second polarization 408(2) may be linear with a second angle. When linear polarization is used, the first polarization 408(1) and the second polarization 408(2) may be perpendicular to one another. For example, the first polarization 408(1) may exhibit a first angle of 0 degrees with respect to a particular reference point, while the second polarization 408(2) exhibits a second angle of 90 degrees.

The polarizer 408 may comprise a dichroic material or structure that passes light with a linear polarization. For example, the polarizer 408 may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

The raw images provided by the biometric input device 306 may undergo processing to provide a set of images obtained using the first and second polarizations 408 that contain a hand 104, ensure that the images are well illuminated and in focus, show the hand 104 in a particular orientation, show the hand 404 in a particular canonical pose, rectified, show which hand 404 is presented (left or right), and so forth. The processed images may then be assessed to determine feature vectors. For example, a neural network may be trained to produce as output a feature vector that characterizes one or more features present in the images or a portion thereof. In some implementations, different neural networks may be used to produce the respective feature vectors for portions of second modality images and portions of first modality images. The resulting feature vectors may then be used to generate a current signature that is indicative of the features of at least a portion of the hand 104 that the user 102 has presented. For example, the feature vectors obtained from different modalities may be concatenated to produce a linear vector that is used as the current signature, or another neural network may access the feature vectors as input and produce the current signature.

Identification of the user 102 who presented the hand 104 to the biometric input device 306(1) may involve the biometric processing system 314 performing one or more comparisons to previously stored data, such as reference signatures produced from feature vectors of images obtained during an enrollment process. For example, the current signature may be compared to previously stored reference signatures. The reference signatures are associated with user identifiers. In one implementation, the identity may be determined based on the reference signature that is the closest in vector space to the current signature. In another implementation, identity may be determined by processing raw image data over time. For example, the confidence values associated with several different user identifiers may be determined, and as successive raw image data is processed confidence values above a threshold value may be used to register a vote for a particular user identifier. When a particular user identifier reaches a threshold number of votes, the identity associated with that user identifier may be deemed to be the identity of the user 102.

At 416 a biometric input device 306(2) is shown comprising a camera 410(2) that obtains an image of at least a portion of the user 102 is depicted. For example, the biometric input device 306(1) may comprise a camera 410 that obtains an image of the user's 102 face. The image may be processed to determine one or more feature vectors which may be stored to previously stored data to determine an identity of the user 102. The camera 410(2) may obtain images using one or more wavelengths of light, including but not limited to ultraviolet, visible light, or infrared. In some implementations, the biometric input device 306(2) may comprise a depth camera that is able to determine a distance from the camera 410(2) to various points on the user 102. For example, the depth camera may be used to generate a point cloud representation of the surface of the user's 102 face that is representative of the 3D shape of the user's 102 face.

At 418 a biometric input device 306(3) is shown comprising a fingerprint scanner. The biometric input device 306(3) is configured to acquire fingerprint data. The biometric input device 306(3) may use an optical, ultrasonic, capacitive, resistive, or other detector to obtain an image or other representation of features of a finger. For example, the biometric input device 306(3) may comprise a capacitive sensor configured to generate an image of features associated with the fingerprint of the user 102.

In other implementations, other biometric input devices 306 may be used to generate biometric data 108 about one or more features of the user 102. For example, a microphone may be used to acquire sound data representative of an utterance by the user 102. The sound data may be processed to determine an identity of the user 102. In some implementations, a combination of the sound of the voice and the utterance of a particular phrase may be used in combination to determine identity. For example, the user 102 may utter a particular phrase, and the sound and content of that utterance is used to identify the user 102.

Figure 5:
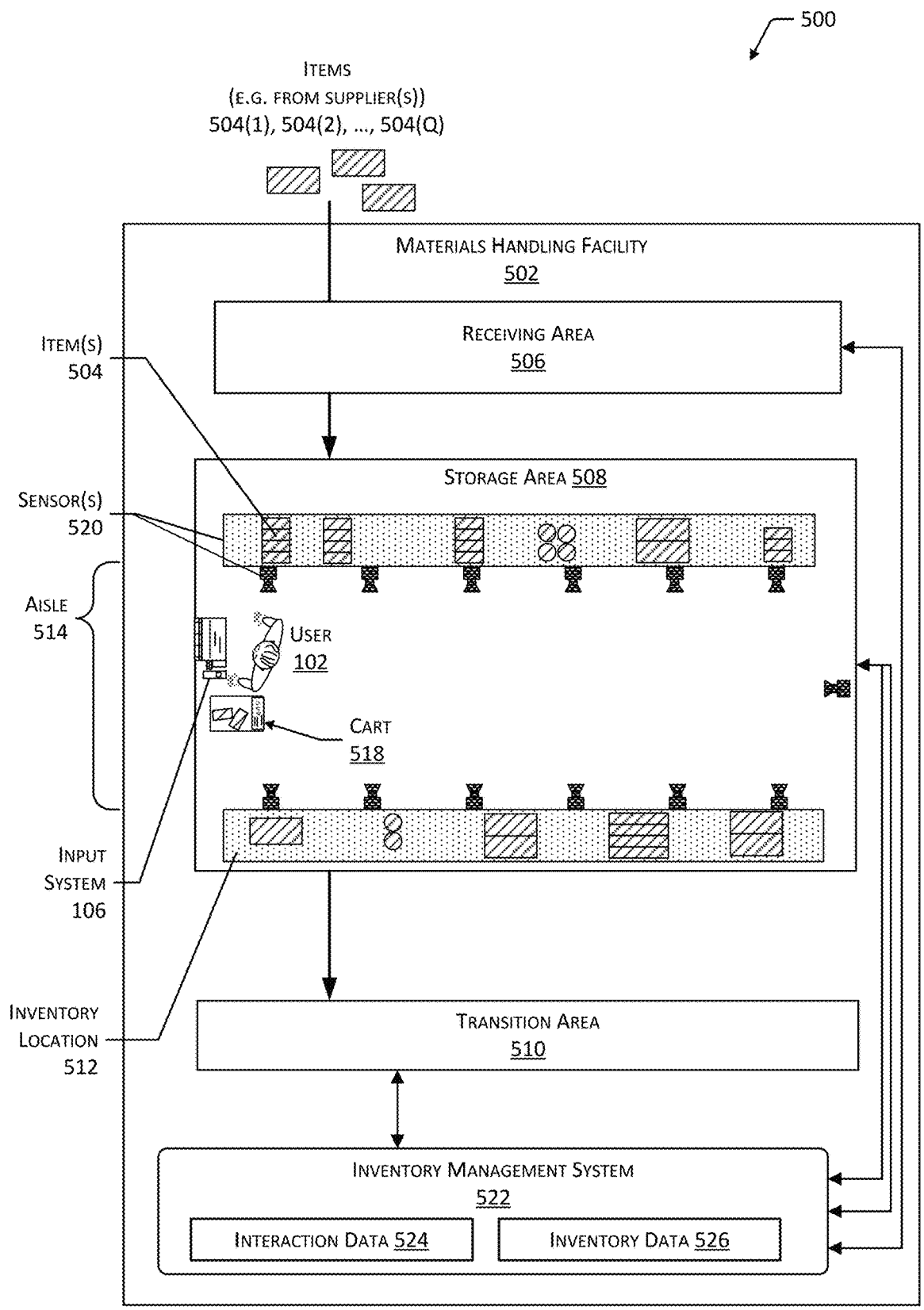
FIG. 5 is a block diagram illustrating a materials handling facility (facility) using the payment system, according to some implementations.

FIG. 5 is a block diagram 500 illustrating a materials handling facility (facility) 502 using the system 100, according to some implementations. A facility 502 comprises one or more physical structures or areas within which one or more items 504(1), 504(2), . . . , 504(Q) may be held. As used in this disclosure, letters in parenthesis such as "(CI)" indicate an integer value greater than or equal to zero. The items 504 may comprise physical goods, such as books, pharmaceuticals, repair parts, electronic gear, and so forth.

The facility 502 may include one or more areas designated for different functions with regard to inventory handling. In this illustration, the facility 502 includes a receiving area 506, a storage area 508, and a transition area 510.

The facility 502 may be configured to receive different kinds of items 504 from various suppliers and to store them until a customer orders or retrieves one or more of the items 504. A general flow of items 504 through the facility 502 is indicated by the arrows of FIG. 5. Specifically, as illustrated in this example, items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. Upon being received from a supplier at the receiving area 506, the items 504 may be prepared for storage in the storage area 508. For example, in some implementations, items 504 may be unpacked or otherwise rearranged. The receiving area 506 may be configured to accept items 504, such as from suppliers, for intake into the facility 502. For example, the receiving area 506 may include a loading dock at which trucks or other freight conveyances unload the items 504. After arriving through the receiving area 506, items 504 may be stored within the storage area 508. In some implementations, like items 504 may be stored or displayed together in the inventory locations 512 such as in bins, on shelves, hanging from pegboards, and so forth. In this implementation, all items 504 of a given kind are stored in one inventory location 512. In other implementations, like items 504 may be stored in different inventory locations 512. For example, to optimize retrieval of certain items 504 having frequent turnover within a large physical facility 502, those items 504 may be stored in several different inventory locations 512 to reduce congestion that might occur at a single inventory location 512.

In some implementations, the items 504 may be processed, such as at the receiving area 506, to generate item data. For example, an item 504 may be weighed, imaged or otherwise scanned to develop reference images or representations of the item 504 at the receiving area 506. In some implementations, a tag on the item 504 may be read to identify the type of item during the receiving process. In one implementation, the items 504 may have the tags applied in the receiving area 506. In another implementation, the tags may be applied by the manufacturer of the item 504, at a transshipment point, and so forth, and the items 504 may arrive with the tags already applied.

The item data provides information about the characteristics of a particular type of item 504. These characteristics may include weight of the item 504 individually or in aggregate. For example, the item data may comprise information indicative of tag data associated with an item 504, a weight of a single item 504, or a package, kit, or other grouping considered to be a single item 504. Other information such as weight distribution may also be stored.

The tag data may include an item identifier. The item identifier may be used to distinguish one type of item 504 from another. For example, the item identifier may include a stock keeping unit (SKU) string, Universal Product Code (UPC) number, and so forth. The items 504 that are of the same type may be referred to by the same item identifier. For example, cans of beef flavor Brand X dog food may be represented by the item identifier value of "9811901181". In other implementations, non-fungible items 504 may each be provided with a unique item identifier, allowing each to be distinguished from one another.

The item data may include data about other characteristics, such as information about appearance for use in machine vision or manual recognition. For example, the item data may include sample images of the type of item 504, three-dimensional point cloud data for the item 530, and so forth. The sample image data may comprise one or more images of one or more of that type of item 504. For example, sample image data may be obtained during processing or intake of the item 504 to be used by the facility 502.

The item data may include other information about the appearance. For example, a plurality of local descriptor values may be generated by feature extraction algorithms, parameters for classifiers, neural network configuration data, and so forth, that characterize the appearance of a representative of one or more of the item 504.

The item data may include one or more geometry data. The geometry data may include information indicative of size and shape of the item 504 in one, two, or three dimensions. For example, the geometry data may include the overall shape of an item 504, such as a cuboid, sphere, cylinder, and so forth. The geometry data may also include information such as length, width, depth, and so forth, of the item 504. Dimensional information in the geometry data may be measured in pixels, centimeters, inches, arbitrary units, and so forth. The geometry data may be for a single item 504, or a package, kit, or other grouping considered to be a single item 504.

The item data may indicate the types and quantities of items 504 that are expected to be stored at that particular inventory location 512 such as in a particular lane on a shelf. The item data may include one or more inventory location identifiers (IDs). The inventory location ID is indicative of a particular area or volume of an inventory location 512 such as a shelf that is designated for stowage of the type of item 504. For example, a single shelf may have several lanes, each with a different inventory location ID. Each of the different inventory location IDs may be associated with a lane having a particular area on the shelf designated for storage of a particular type of item 504. A single type of item 504 may be associated with a particular inventory location ID, a plurality of inventory location IDs may be associated with the single type of item 504, more than one type of item 504 may be associated with the particular inventory location ID, and so forth.

The storage area 508 is configured to store the items 504. The storage area 508 may be arranged in various physical configurations. In one implementation, the storage area 508 may include one or more aisles 514. The aisle 514 may be configured with, or defined by, inventory locations 512 on one or both sides of the aisle 514. The inventory locations 512 may include one or more of a shelf, a rack, a case, a cabinet, a bin, a floor location, or other suitable storage mechanisms for holding, supporting, or storing the items 504. For example, the inventory locations 512 may comprise shelves with lanes designated therein. The inventory locations 512 may be affixed to the floor or another portion of the structure of the facility 502. The inventory locations 514 may also be movable such that the arrangement of aisles 514 may be reconfigurable. In some implementations, the inventory locations 512 may be configured to move independently of an outside operator. For example, the inventory locations 512 may comprise a rack with a power source and a motor, operable by a computing device to allow the rack to move from one location within the facility 502 to another.

One or more users 102(1), 102(2), . . . , 102(U) and carts 518(1), 518(2), . . . , 518(T) or other material handling apparatus may move within the facility 502. For example, the user 102 may move about within the facility 502 to pick or place the items 504 in various inventory locations 512, placing them on the cart 518 for ease of transport. The cart 518 is configured to carry or otherwise transport one or more items 504. For example, the cart 518 may include a basket, bag, bin, and so forth. In some implementations, the cart 518 may include a camera. For example, as items 504 are placed into or removed from the cart 518, the camera may be used to acquire the image data that is then used to read the tags and generate tag data. The tag data may then be used to determine the items 504 that are in the cart 518.

Other material handling apparatuses such as robots, forklifts, cranes, aerial drones, and so forth, may move about the facility 502 picking, placing, or otherwise moving the items 504. For example, a robot may pick an item 504 from a first inventory location 512(1) and move the item 504 to a second inventory location 512(2).

One or more sensors 520 may be configured to acquire information in the facility 502. The sensors 520 may include the camera described above. Other sensors 520, such as cameras, weight sensors, and so forth may also be used. The sensors 520 may be stationary or mobile, relative to the facility 502. For example, the inventory locations 512 may contain weight sensors to acquire weight sensor data of items 504 stowed therein and detection systems to acquire images of picking or placement of items 504 on shelves, and so forth. In another example, the facility 502 may include cameras to obtain images of the user 102 or other objects in the facility 502. The sensors 520 may be used to determine the tag data. The sensors 520 are discussed in more detail below with regard to FIG. 6.

While the storage area 508 is depicted as having one or more aisles 514, inventory locations 512 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, in some implementations, multiple different receiving areas 506, storage areas 508, and transition areas 510 may be interspersed rather than segregated in the facility 502.

The facility 502 may include, or be coupled to, an inventory management system 522. The inventory management system 522 is configured to interact with users 102 or devices such as sensors 520, robots, material handling equipment, computing devices, and so forth, in one or more of the receiving area 506, the storage area 508, or the transition area 510.

During operation of the facility 502, the sensors 520 may be configured to provide sensor data, or information based on the sensor data, to the inventory management system 522. The sensor data may include tag data, image data, non-image data such as weight sensor data obtained from weight sensors, and so forth.

The inventory management system 522 or other systems may use the sensor data to track the location of objects within the facility 502, movement of the objects, or provide other functionality. Objects may include, but are not limited to, items 504, users 102, carts 518, and so forth. For example, a series of images acquired by a camera may indicate removal by the user 102 of an item 504 from a particular location on the inventory location 512 and placement of the item 504 on or at least partially within the cart 518. The item 504 may be identified by using the camera to produce image data that is processed to determine the tag data indicative of the tags on the item 504. The resulting tag data may be used to determine the type of item 504 that was picked or placed at the inventory location 512.

The inventory management system 522 may include one or more software applications executing on a computer system to provide inventory management functions. These inventory management functions may include maintaining information indicative of the type, quantity, condition, cost, location, weight, or any other suitable parameters with respect to the items 504. The items 504 may be stocked, managed, or dispensed in terms of countable units, individual units, or multiple units, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of a measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

When a customer order specifying one or more items 504 is received, or as a user 102 progresses through the facility 502, the corresponding items 504 may be selected or "picked" from the inventory locations 512 containing those items 504. In various implementations, item picking may range from manual to completely automated picking. For example, in one implementation, a user 102 may have a list of items 504 they desire and may progress through the facility 502 picking items 504 from inventory locations 512 within the storage area 508 and placing those items 504 into a cart 518. In other implementations, employees of the facility 502 may pick items 504 using written or electronic pick lists derived from customer orders. These picked items 504 may be placed into the cart 518 as the employee progresses through the facility 502.

After items 504 have been picked, the items 504 may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the item 504 may be transitioned from the storage area 508 to the packing station. Information about the transition may be maintained by the inventory management system 522.

In another example, if the items 504 are departing the facility 502, a list of the items 504 may be obtained and used by the inventory management system 522 to transition responsibility for, or custody of, the items 504 from the facility 502 to another entity. For example, a carrier may accept the items 504 for transport with that carrier accepting responsibility for the items 504 indicated in the list. In another example, a user 102 may purchase or rent the items 504 and remove the items 504 from the facility 502. This purchase may be facilitated by the payment system 100. For example, before departing the facility 502 with the items 504, the user 104 may provide biometric input using the input system 106. The input system 106 may operate in conjunction with the support tokenization system 120 as described above to provide a transaction that charges the first payment account 132 for the cost of the items 504.

During use of the facility 502, the user 102 may move about the facility 502 to perform various tasks, such as picking or placing the items 504 in the inventory locations 512. To facilitate operation of the facility 502, the inventory management system 522 is configured to use the sensor data including the tag data, weight sensor data, image data, and other information such as the item data, the physical layout data, and so forth, to generate interaction data 524.

The interaction data 524 may provide information about an interaction, such as a pick of an item 504 from the inventory location 512, a place of an item 504 to the inventory location 512, a touch made to an item 504 at the inventory location 512, a gesture associated with an item 504 at the inventory location 512, and so forth. The interaction data 524 may include one or more of the type of interaction, interaction location identifier indicative of where from the inventory location 512 the interaction took place, item identifier, quantity change to the item 504, user identifier, and so forth. The interaction data 524 may then be used to further update the inventory data 526. For example, the quantity of items 504 on hand at a particular lane on the shelf may be changed based on an interaction that picks or places one or more items 504.

The inventory management system 522 may combine or otherwise utilize data from different sensors 520 of different types. For example, tag data may be used in conjunction with weight data obtained from weight sensors 520 at the inventory location 512 to determine the interaction data 524.

The inventory management system 522 may generate other data. In one implementation, user billing data may be generated that comprises a bill or invoice for the items 504 that have been taken into the custody of the user 102. For example, as the user 102 leaves the facility 502 with their cart 518, a list and cost associated with the purchase for those items 504 may be determined, taxes or other fees assessed, and that information included in the user billing data.

The inventory management system 522 may also maintain inventory data 526. For example, the inventory data 526 may comprise information such as quantity on hand at a particular inventory location 512, determine when to order additional items 504 for restock, and so forth.

In some implementations, the inventory management system 522 may use the tag data to direct the movement of items 504 within the facility 502. For example, the user 102 may be wearing an augmented reality headset that presents audible or visual information to the user 102. The system may read the tags on the item 504 and generate tag data that identifies that item 504. The inventory management system 522 may use that tag data to determine that the item 504 is to be stowed in a particular inventory location 512. The inventory management system 522 may generate instructions to present prompts to the user 102 by way of the augmented reality headset, directing the user 102 to place the item 504 in the particular inventory location 512.

Figure 6:
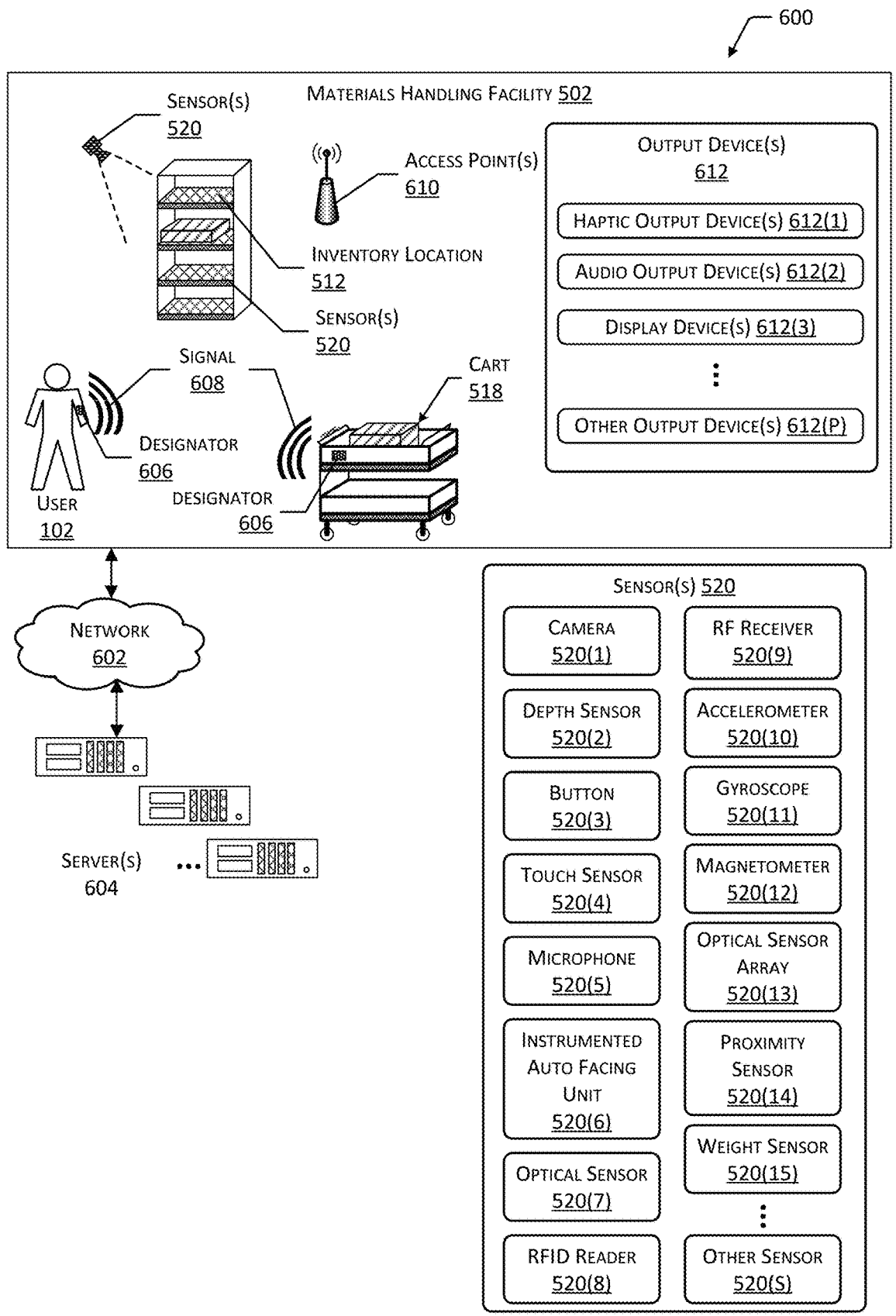
FIG. 6 is a block diagram illustrating additional details of the facility, according to some implementations.

FIG. 6 is a block diagram 600 illustrating additional details of the facility 502, according to some implementations. The facility 502 may be connected to one or more networks 602, which in turn connect to one or more servers 604. The network 602 may include private networks such as an institutional or personal intranet, public networks such as the Internet, or a combination thereof. The network 602 may utilize wired technologies (e.g., wires, fiber optic cables, and so forth), wireless technologies (e.g., radio frequency, infrared, acoustic, optical, and so forth), or other connection technologies. The network 602 is representative of any type of communication network, including one or more of data networks or voice networks. The network 602 may be implemented using wired infrastructure (e.g., copper cable, fiber optic cable, and so forth), a wireless infrastructure (e.g., cellular, microwave, satellite, and so forth), or other connection technologies.

The servers 604 may be configured to execute one or more modules or software applications associated with the inventory management system 522 or other systems. While the servers 604 are illustrated as being in a location outside of the facility 502, in other implementations, at least a portion of the servers 604 may be located at the facility 502. The servers 604 may include memory, processors, and so forth.

The users 102, the carts 518, or other objects in the facility 502 may be equipped with one or more designators 606. The designators 606 may be configured to emit a signal 608. In one implementation, the designator 606 may be a radio frequency identification (RFID) designator 606 configured to emit an RF signal 608 upon activation by an external signal. For example, the external signal may comprise a radio frequency signal or a magnetic field configured to energize or activate the RFID designator 606. In another implementation, the designator 606 may comprise a transmitter and a power source configured to power the transmitter. For example, the designator 606 may comprise a Bluetooth Low Energy (BLE) transmitter and battery. In other implementations, the designator 606 may use other techniques to indicate presence of the designator 606. For example, an acoustic designator 606 may be configured to generate an ultrasonic signal 608, which is detected by corresponding acoustic receivers. In yet another implementation, the designator 606 may be configured to emit an optical signal 608.

The inventory management system 522 may be configured to use the designators 606 for one or more of identification of the object, determining a location of the object, and so forth. For example, the users 102 may wear designators 606, the carts 518 may have designators 606 affixed, and so forth, which may be read and, based at least in part on signal strength, used to determine identity and location.

Generally, the inventory management system 522 or other systems associated with the facility 502 may include any number and combination of input components, output components, and servers 604.

The one or more sensors 520 may be arranged at one or more locations within the facility 502. For example, the sensors 520 may be mounted on or within a floor, wall, at a ceiling, at an inventory location 512, on a cart 518, may be carried or worn by a user 102, and so forth.

The sensors 520 may include one or more cameras 520(1) or other imaging sensors. The one or more cameras 520(1) may include imaging sensors configured to acquire images of a scene. The cameras 520(1) are configured to detect light in one or more wavelengths including, but not limited to, terahertz, infrared, visible, ultraviolet, and so forth. The cameras 520(1) may comprise charge coupled devices (CCD), complementary metal oxide semiconductor (CMOS) devices, microbolometers, and so forth. The inventory management system 522 may use image data acquired by the cameras 520(1) during operation of the system in the facility 502. For example, the inventory management system 522 may identify items 504, users 102, carts 518, and so forth, based at least in part on their appearance within the image data acquired by the cameras 520(1). The cameras 520(1) may be mounted in various locations within the facility 502. For example, cameras 520(1) may be mounted overhead, on inventory locations 512, may be worn or carried by users 102, may be affixed to carts 518, and so forth.

One or more depth sensors 520(2) may also be included in the sensors 520. The depth sensors 520(2) are configured to acquire spatial or three-dimensional (3D) data, such as depth information, about objects within a field of view (FOV). The depth sensors 520(2) may include range cameras, lidar systems, sonar systems, radar systems, structured light systems, stereo vision systems, optical interferometry systems, and so forth. The inventory management system 522 may use the 3D data acquired by the depth sensors 520(2) to identify objects, determine a location of an object in 3D real space, and so forth.

One or more buttons 520(3) may be configured to accept input from the user 102. The buttons 520(3) may comprise mechanical, capacitive, optical, or other mechanisms. For example, the buttons 520(3) may comprise mechanical switches configured to accept an applied force from a touch of the user 102 to generate an input signal. The inventory management system 522 may use data from the buttons 520(3) to receive information from the user 102. For example, the cart 518 may be configured with a button 520(3) to accept input from the user 102 and send information indicative of the input to the inventory management system 522.

The sensors 520 may include one or more touch sensors 520(4). The touch sensors 520(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 522 may use data from the touch sensors 520(4) to receive information from the user 102. For example, the touch sensor 520(4) may be integrated with the cart 518 to provide a touchscreen with which the user 102 may select from a menu one or more particular items 504 for picking, enter a manual count of items 504 at an inventory location 512, and so forth.

One or more microphones 520(5) may be configured to acquire information indicative of sound present in the environment. In some implementations, arrays of microphones 520(5) may be used. These arrays may implement beam-forming techniques to provide for directionality of gain. The inventory management system 522 may use the one or more microphones 520(5) to acquire information from acoustic designators 606, accept voice input from the users 102, determine ambient noise level, and so forth.

The sensors 520 may include instrumented auto facing units (IAFUs) 520(6). The IAFU 520(6) may comprise a position sensor configured to provide data indicative of displacement of a pusher. As an item 504 is removed from the IAFU 520(6), the pusher moves, such as under the influence of a spring, and pushes the remaining items 504 in the IAFU 520(6) to the front of the inventory location 512. By using data from the position sensor and given item data such as a depth of an individual item 504, a count may be determined, based on a change in position data. For example, if each item 504 is 1 inch deep, and the position data indicates a change of 6 inches, the quantity held by the IAFU 520(6) may have changed by 6 items 504. This count information may be used to confirm or provide a cross check for a count obtained by other means, such as analysis of the weight sensor data.

The sensors 520 may include one or more optical sensors 520(7). The optical sensors 520(7) may be configured to provide data indicative of one or more of color or intensity of light impinging thereupon. For example, the optical sensor 520(7) may comprise a photodiode and associated circuitry configured to generate a signal or data indicative of an incident flux of photons. As described below, the optical sensor array 520(13) may comprise a plurality of the optical sensors 520(7). The optical sensors 520(7) may include photodiodes, photoresistors, photovoltaic cells, quantum dot photoconductors, bolometers, pyroelectric infrared detectors, and so forth. For example, the optical sensor 520(7) may use germanium photodiodes to detect infrared light.

One or more radio frequency identification (RFID) readers 520(8), near field communication (NFC) systems, and so forth, may be included as sensors 520. For example, the RFID readers 520(8) may be configured to read the RF designators 606. Information acquired by the RFID reader 520(8) may be used by the inventory management system 522 to identify an object associated with the RF designator 606 such as the item 504, the user 102, the cart 518, and so forth. For example, based on information from the RFID readers 520(8) detecting the RF designator 606 at different times and RFID readers 520(8) having different locations in the facility 502, a velocity of the RF designator 606 may be determined.

One or more RF receivers 520(9) may also be included as sensors 520. In some implementations, the RF receivers 520(9) may be part of transceiver assemblies. The RF receivers 520(9) may be configured to acquire RF signals 608 associated with Wi-Fi, Bluetooth, ZigBee, 4G, LTE, 5G, 6G or other wireless data transmission technologies. The RF receivers 520(9) may provide information associated with data transmitted via radio frequencies, signal strength of RF signals 608, and so forth. For example, information from the RF receivers 520(9) may be used by the inventory management system 522 to determine a location of an RF source, such as a communication interface onboard the cart 518.

The sensors 520 may include one or more accelerometers 520(10), which may be worn or carried by the user 102, mounted to the cart 518, and so forth. The accelerometers 520(10) may provide information such as the direction and magnitude of an imposed acceleration. Data such as rate of acceleration, determination of changes in direction, speed, and so forth, may be determined using the accelerometers 520(10).

A gyroscope 520(11) may provide information indicative of rotation of an object affixed thereto. For example, the cart 518 or other objects may be equipped with a gyroscope 520(11) to provide data indicative of a change in orientation of the object.

A magnetometer 520(12) may be used to determine an orientation by measuring ambient magnetic fields, such as the terrestrial magnetic field. The magnetometer 520(12) may be worn or carried by the user 102, mounted to the cart 518, and so forth. For example, the magnetometer 520(12) mounted to the cart 518 may act as a compass and provide information indicative of which direction the cart 518 is oriented.

An optical sensor array 520(13) may comprise one or more optical sensors 520(7). The optical sensors 520(7) may be arranged in a regular, repeating, or periodic two-dimensional arrangement such as a grid. The optical sensor array 520(13) may generate image data. For example, the optical sensor array 520(13) may be arranged within or below an inventory location 512 and obtain information about shadows of items 504, hand 104 of the user 102, and so forth.

The sensors 520 may include proximity sensors 520(14) used to determine presence of an object, such as the user 102, the cart 518, and so forth. The proximity sensors 520(14) may use optical, electrical, ultrasonic, electromagnetic, or other techniques to determine a presence of an object. In some implementations, the proximity sensors 520(14) may use an optical emitter and an optical detector to determine proximity. For example, an optical emitter may emit light, a portion of which may then be reflected by the object back to the optical detector to provide an indication that the object is proximate to the proximity sensor 520(14). In other implementations, the proximity sensors 520(14) may comprise a capacitive proximity sensor 520(14) configured to provide an electrical field and determine a change in electrical capacitance due to presence or absence of an object within the electrical field.

The proximity sensors 520(14) may be configured to provide sensor data indicative of one or more of a presence or absence of an object, a distance to the object, or characteristics of the object. An optical proximity sensor 520(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 520 such as a camera 520(1). Based on an apparent distance between the features of the structured light pattern, the distance to the object may be calculated. Other techniques may also be used to determine distance to the object. In another example, the color of the reflected light may be used to characterize the object, such as skin, clothing, cart 518, and so forth.

One or more weight sensors 520(15) are configured to measure the weight of a load, such as the item 504, the cart 518, or other objects. The weight sensors 520(15) may be configured to measure the weight of the load at one or more of the inventory locations 512, the cart 518, on the floor of the facility 502, and so forth. For example, the shelf may include a plurality of lanes or platforms, with one or more weight sensors 520(15) beneath each one to provide weight sensor data about an individual lane or platform. The weight sensors 520(15) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 520(15) may operate as transducers that generate one or more signals based on an applied force, such as that of the load due to gravity. For example, the weight sensor 520(15) may comprise a load cell having a strain gauge and a structural member that deforms slightly when weight is applied. By measuring a change in the electrical characteristic of the strain gauge, such as capacitance or resistance, the weight may be determined. In another example, the weight sensor 520(15) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 522 may use the data acquired by the weight sensors 520(15) to identify an object, determine a change in the quantity of objects, determine a location of an object, maintain shipping records, and so forth.

The sensors 520 may include other sensors 520(S) as well. For example, the other sensors 520(S) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 520(1) or other sensors 520(S) may include hardware processors, memory, and other elements configured to perform various functions. For example, the cameras 520(1) may be configured to generate image data, send the image data to another device, and so forth.

The facility 502 may include one or more access points 610 configured to establish one or more wireless networks. The access points 610 may use Wi-Fi, NFC, Bluetooth, or other technologies to establish wireless communications between a device and the network 602. The wireless networks allow the devices to communicate with one or more of the sensors 520, the inventory management system 522, the designator 606, a communication device of the cart 518, or other devices.

Output devices 612 may also be provided in the facility 502. The output devices 612 are configured to generate signals, which may be perceived by the user 102 or detected by the sensors 520.

Haptic output devices 612(1) are configured to provide a signal that results in a tactile sensation to the user 102. The haptic output devices 612(1) may use one or more mechanisms such as electrical stimulation or mechanical displacement to provide the signal. For example, the haptic output devices 612(1) may be configured to generate a modulated electrical signal, which produces an apparent tactile sensation in one or more fingers of the user 102. In another example, the haptic output devices 612(1) may comprise piezoelectric or rotary motor devices configured to provide a vibration, which may be felt by the user 102.

One or more audio output devices 612(2) may be configured to provide acoustic output. The acoustic output includes one or more of infrasonic sound, audible sound, or ultrasonic sound. The audio output devices 612(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 612(3) may be configured to provide output, which may be seen by the user 102 or detected by a light-sensitive sensor such as a camera 520(1) or an optical sensor 520(7). In some implementations, the display devices 612(3) may be configured to produce output in one or more of infrared, visible, or ultraviolet light. The output may be monochrome or in color. The display devices 612(3) may be one or more of emissive, reflective, microelectromechanical, and so forth. An emissive display device 612(3), such as using LEDs, is configured to emit light during operation. In comparison, a reflective display device 612(3), such as using an electrophoretic element, relies on ambient light to present an image. Backlights or front lights may be used to illuminate non-emissive display devices 612(3) to provide visibility of the output in conditions where the ambient light levels are low.

The display devices 612(3) may be located at various points within the facility 502. For example, the addressable displays may be located on inventory locations 512, carts 518, on the floor of the facility 502, and so forth.

Other output devices 612(P) may also be present. For example, the other output devices 612(P) may include scent/odor dispensers, document printers, 3D printers or fabrication equipment, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first memory storing first computer-executable instructions; and
   one or more hardware processors to execute the first computer-executable instructions to:
   receive from a first device:
      biometric data, and
      first transaction data indicative of a first transaction amount;
   determine, based on the biometric data, a user account associated with the biometric data;
   determine a first payment account, associated with the user account, that does not support tokenization;
   determine a second payment account that has been assigned to the user account responsive to the first payment account not supporting tokenization, wherein the second payment account supports tokenization;
   create, based on the second payment account, a token;
   send the token to the first device;
   receive second transaction data indicative of a second transaction amount that is based on the token;
   determine the first transaction amount is equal to the second transaction amount;
   determine, based on the first payment account, third transaction data indicative of the first transaction amount; and
   initiate a transaction, based on the third transaction data, to settle the first transaction amount from the first payment account.

2. The system of claim 1, wherein the first payment account is associated with a first entity and the second payment account is associated with a second entity.

3. The system of claim 1, wherein the first device acquires the biometric data using one or more of:
   a camera,
   a fingerprint scanner, or
   a microphone.

4. A computer-implemented method comprising:
   receiving, from a user device, biometric data and first transaction data indicative of a first transaction amount that is associated with the biometric data;
   determining, based on the biometric data, a first user account;
   determining a first payment account associated with the first user account that does not support tokenization, wherein the first payment account is associated with a first entity;
   determining a second payment account that has been assigned to the first user account responsive to the first payment account not supporting tokenization, wherein the second payment account supports tokenization, and wherein the second payment account is associated with a second entity;
   generating, based on the second payment account, a token;
   sending the token;
   receiving second transaction data indicative of a second transaction amount that is based on the token;
   determining the first transaction amount is equal to the second transaction amount;
   determining, based on the first payment account, third transaction data indicative of the first transaction amount; and
   initiating a transaction, based on the third transaction data, to settle the first transaction amount from the first payment account.

5. The method of claim 4, wherein at least a portion of the token is compliant with at least a portion of the ISO/IEC 7816 standard as promulgated by the International Organization for Standardization (ISO).

6. The method of claim 4, further comprising:
   creating, based on the biometric data, the first user account;
   receiving the first payment account;
   determining that the first payment account does not support tokenization; and
   assigning the second payment account to the first user account responsive to the determining that the first payment account does not support tokenization.

7. The method of claim 6, further comprising:
   determining a first payment network associated with the first payment account; and
   wherein the second payment account is associated with the first payment network.

8. The method of claim 6, further comprising:
   determining first data that is based on correspondence of one or more attributes of the first payment account with permitted payment account criteria; and
   wherein the assigning the second payment account is based on the first data.

9. The method of claim 4, further comprising:
   determining a first set of unassigned payment accounts, wherein each of the unassigned payment accounts is valid; and
   assigning, from the first set of unassigned payment accounts, the second payment account to the first user account.

10. The method of claim 4, wherein the second payment account is associated with only the first user account.

11. The method of claim 4, further comprising:
determining account limit data that is associated with the first user account;
determining first data based on one or more attributes of the first transaction data being less than or equal to the account limit data; and
wherein the generating the token is based on the first data.

12. The method of claim 4, further comprising:
determining fourth transaction data based on the first payment account;
sending the fourth transaction data;
receiving, responsive to the fourth transaction data, first data indicative of an approval of the first payment account; and
wherein one or more of the generating the token or the sending the token is based on the first data.

13. The method of claim 4, wherein the first transaction data is indicative of one or more of:
a purchase of a good or service, or
a return of a good or service.

14. A system comprising:
one or more memories storing computer-executable instructions; and
one or more hardware processors to execute the computer-executable instructions to:
receive, from a first device, biometric data and first transaction data indicative of a first transaction amount;
determine a first user account that is associated with the biometric data;
determine a first payment account, associated with the first user account that does not support a first payment mode, wherein the first payment account is associated with a first entity;
determine a second payment account, wherein the second payment account has been assigned to the first user account responsive to the first payment account not supporting the first payment mode, wherein the second payment account supports the first payment mode, and wherein the second payment account is associated with a second entity;
create, based on the second payment account, first data that is representative of the second payment account;
send the first data;
receive second transaction data indicative of a second transaction amount that is based on the first data;
determine the first transaction amount is equal to the second transaction amount;
determine, based on the first payment account, third transaction data indicative of the first transaction amount; and
initiate a transaction, based on the third transaction data, to settle the first transaction amount from the first payment account.

15. The system of claim 14, the one or more hardware processors to further execute the computer-executable instructions to:
determine the biometric data, wherein the biometric data is associated with the first transaction data.

16. The system of claim 14, wherein the first data comprises one or more of:
a payment token,
an application primary account number,
a cardholder name that is associated with the second entity,
an application expiration date, or
an application primary account number sequence number.

17. The system of claim 14, wherein at least a portion of the first data is compliant with at least a portion of the ISO/IEC 14443 standard as promulgated by the International Organization for Standardization (ISO).

18. The system of claim 14, the one or more hardware processors to further execute the computer-executable instructions to:
create, based on the biometric data, the first user account;
receive data indicative of the first payment account;
determine the first payment account does not support the first payment mode; and
assign the second payment account to the first user account, responsive to the first payment account not supporting the first payment mode.

19. The system of claim 14, the one or more hardware processors to further execute the computer-executable instructions to:
determine account limit data that is associated with the first user account; and
responsive to second data based on one or more attributes of the first transaction data being less than or equal to the account limit data, determine the first data.

20. The system of claim 14, the one or more hardware processors to further execute the computer-executable instructions to:
determine fourth transaction data based on the first payment account;
send the fourth transaction data;
receive, responsive to the fourth transaction data, second data indicative of an approval of the first payment account; and
responsive to the second data, determine the first data or send the first data.

* * * * *